(12) United States Patent
Pfau et al.

(10) Patent No.: US 8,310,349 B2
(45) Date of Patent: *Nov. 13, 2012

(54) HAPTIC SURFACE WITH MECHANICAL BUTTONS

(75) Inventors: Douglas Allen Pfau, Canton, MI (US); David Michael Whitton, Saline, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 466 days.

This patent is subject to a terminal disclaimer.

(21) Appl. No.: 12/569,086

(22) Filed: Sep. 29, 2009

(65) Prior Publication Data

US 2011/0074560 A1  Mar. 31, 2011

(51) Int. Cl.
*H04B 3/36* (2006.01)

(52) U.S. Cl. ............ 340/407.1; 340/407.2; 340/425.5; 340/12.54; 340/12.55; 340/13.24; 340/13.31; 345/156; 345/168; 345/173; 345/175; 345/179; 345/184

(58) Field of Classification Search ........... 340/407.1, 340/407.2, 425.5, 12.54, 12.55, 13.24, 13.31; 345/156, 168, 173, 175, 179, 184
See application file for complete search history.

(56) References Cited

U.S. PATENT DOCUMENTS

| | | |
|---|---|---|
| 6,693,626 B1 | 2/2004 | Rosenberg |
| 6,697,044 B2 | 2/2004 | Shahoian et al. |
| 6,961,644 B2 | 11/2005 | Mercier et al. |
| 7,106,305 B2 | 9/2006 | Rosenberg |
| 7,205,978 B2 | 4/2007 | Poupyrev et al. |
| 7,324,094 B2 | 1/2008 | Moilanen et al. |
| 7,336,266 B2 | 2/2008 | Hayward et al. |
| 7,339,574 B2 | 3/2008 | Kyung et al. |
| 7,356,448 B2 | 4/2008 | Schaeffer |
| 7,616,192 B2 * | 11/2009 | Schroeder .................. 345/173 |
| 2003/0174121 A1 | 9/2003 | Poupyrev et al. |
| 2004/0117084 A1 | 6/2004 | Mercier et al. |
| 2005/0128186 A1 | 6/2005 | Shahoian et al. |
| 2005/0156877 A1 | 7/2005 | Schaeffer |
| 2005/0204312 A1 | 9/2005 | Rosel |
| 2005/0230594 A1 | 10/2005 | Sato et al. |
| 2005/0259076 A1 | 11/2005 | Hayasaka et al. |
| 2006/0015560 A1 | 1/2006 | MacAuley et al. |
| 2006/0025220 A1 | 2/2006 | Macauley et al. |
| 2007/0040815 A1 * | 2/2007 | Rosenberg et al. .......... 345/173 |
| 2007/0146316 A1 | 6/2007 | Poupyrev et al. |
| 2007/0152974 A1 | 7/2007 | Kim et al. |
| 2007/0243835 A1 | 10/2007 | Zhu et al. |
| 2008/0018592 A1 | 1/2008 | Park |
| 2008/0084384 A1 | 4/2008 | Gregorio et al. |
| 2008/0100568 A1 * | 5/2008 | Koch et al. .................. 345/156 |
| 2009/0174672 A1 * | 7/2009 | Schmidt ...................... 345/173 |
| 2010/0090814 A1 * | 4/2010 | Cybart et al. ............... 340/407.2 |

* cited by examiner

*Primary Examiner* — Tai T Nguyen

(74) *Attorney, Agent, or Firm* — Dickinson Wright PLLC

(57) ABSTRACT

A haptic system including a plurality of mechanical buttons driven by a single haptic feedback driver. The mechanical buttons are integrated within the haptic surface and are configured to move with the haptic interface relative to said base. The haptic surface may include a touch screen interface.

16 Claims, 3 Drawing Sheets

HAPTIC SURFACE WITH MECHANICAL BUTTONS

BACKGROUND OF THE INVENTION

1. Technical Field

The present invention is directed to a robust and compact haptic feedback system, more specifically, a haptic system that includes mechanical buttons with traditional haptics contained within a microprocessor controlled haptic feedback driven system.

2. Discussion

To improve and enhance the ability of users to interface with various electronic devices, many manufacturers have added haptic feedback systems to various devices. In general, haptic feedback systems interface with a user via the sense of touch by applying forces, vibrations, and/or motions to the user. While haptic feedback devices can be used in a variety of devices, one particular area where haptic feedback is useful is touch surface such as a decorated surface or a surface that is clear to allow viewing of a display image, more specifically, touch screens). One particular area where haptic feedback is useful is touch screen interfaces or compact mechanical button interfaces, where the ability to visually interact is limited or reduced. For example, operators of vehicles and smaller devices where size is a concern, such as inputs for cell phones and other portable electronic device benefit from the addition of haptic feedback systems. More specifically, haptic feedback systems are very helpful in providing the user with feedback without the use of visual confirmation by the user, or where the input member is too small to easily see, such as a touch surface keypad on a mobile phone. Haptic feedback is very useful in situations where the ability of the user to visually confirm actions may be constrained such as an operator of a mobile vehicle attempting to provide input or change settings on the vehicle, including climate control systems, GPS systems, and entertainment systems. More specifically, in motor vehicles, to minimize distraction during operation of the vehicle, haptic feedback systems provide the user with a touch feedback allowing the user to confirm that the desired input was entered or received by the vehicle while allowing the user to stay visually focused where needed during operation of the vehicle.

Due to design and aesthetic considerations, as well as advances in technology, many electronic devices now incorporate touch surface interfaces. These touch surfaces have flat surfaces with touch feedback or clear displays that use electronic or digital visual buttons and provide haptic feedback when the touch surface button or digitally created button is pressed. The haptic feedback is generally provided by moving the entire surface interface. One potential desire of consumers is to include mechanical buttons for some inputs and to have them incorporated into a touch surface interface; however, such mechanical buttons typically do not move with the touch surface interface and therefore require large gaps between the button and interface, or if the gaps are reduced, they constrain the amount of motion for haptic feedback of the touch surface interface. Any large gaps are typically undesirable to the consumer and problematic as they may allow dust, contaminants and liquids access to the electronics behind the touch screen interface.

Therefore, there is the potential desire for a system that may include a large touch surface interface having mechanical buttons that have traditional haptic feedback not associated with the microprocessor controlled haptics incorporated into the touch surface interface.

SUMMARY OF THE INVENTION

The present invention is directed to a robust and compact haptic feedback system, more specifically, a haptic system that includes mechanical buttons with traditional haptics contained within a microprocessor controlled haptic feedback driven system.

The present invention allows for the combination of a typical mechanical buttons and haptic surfaces to be designed and combined within a single surface assembly, specifically microprocessors or controlled haptic surfaces. By separating the button electrical actuation from the mechanical haptics of the mechanical button, the mass that the haptic system needs to carry is reduced and therefore allows the haptic system to operate with improved efficiency. This is possible because the de-coupled electronic circuit board can be moved once haptics are de-coupled to the carrier vs. the surface being activated with haptics.

The present invention will become more fully understood from the detailed description given here below, the appended claims, and the accompanying drawings in which:

DETAILED DESCRIPTION OF THE PREFERRED EMBODIMENT

Figure 1:
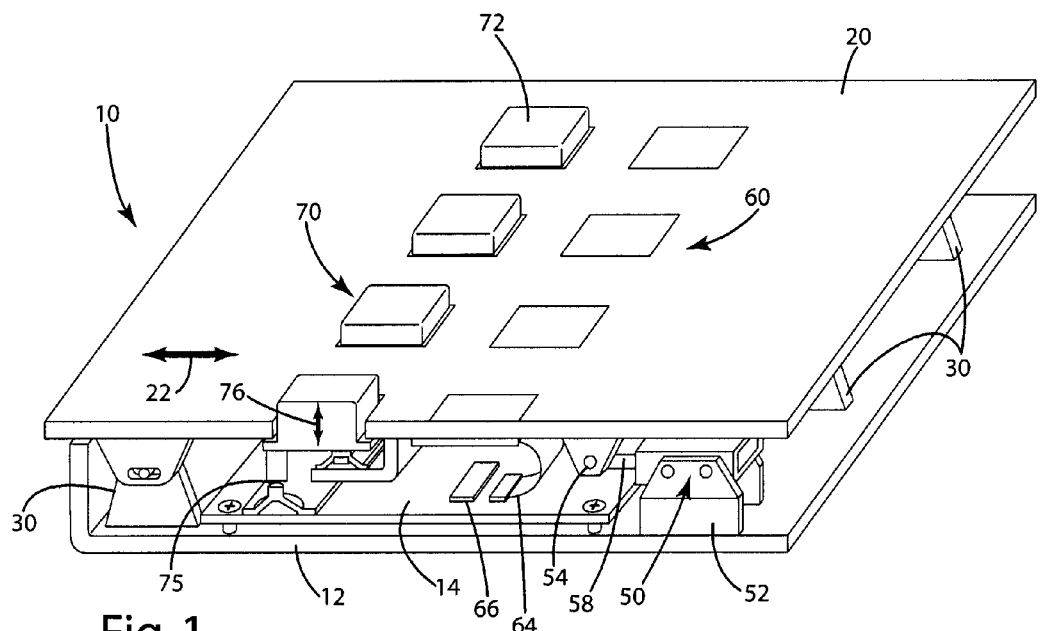
FIG. 1 is a perspective view of an exemplary haptic system with example mechanical buttons.

The present invention is directed to a haptic feedback system such as the exemplary haptic system 10 illustrated in FIG. 1. The haptic system 10 may be generally formed in any size, shape, or configuration and implemented in any desired device or any configuration within a device. The haptic system 10 is particularly applicable to devices having large input touch surface interface including multiple mechanical buttons 72, or at least one mechanical button within an electronic interface, such as a touch surface 60. The haptic system 10 generally includes a rigid base 12 coupled to a haptic interface surface 20 such as illustrated with a guidance system 30 therebetween. The guidance system 30 is configured to travel along a single axis to allow the desired haptic feedback to a user. More specifically, a haptic feedback driver 50 moves the haptic interface 20 relative to the rigid base 12 thereby providing haptic feedback along a single axis of movement and the guidance system 30 constrains applied forces and movement of the interface surface to the single axis of movement.

Depending on the desired functions, types of interfaces and configurations, as well as the type of device in which the haptic feedback system is incorporated, the size, shape, style, and configuration of the haptic feedback system 10 may vary widely. The rigid base 12 may vary in size, shape, and configuration and depend on the type of device in which the haptic feedback system 10 is incorporated. For example, the rigid base 12 may be formed separately as illustrated in FIG. 1 or be formed as part of the frame or housing of the device (not illustrated). Similarly, the circuit boards 14 may have any desired size, shape, and configuration and instead of the single circuit board shown in FIG. 1 may be formed in multiple circuit boards, or in some embodiments, the related circuit boards may be located remotely from the haptic interface 20.

The haptic feedback driver 50 is coupled to the rigid base 12, or another fixed object, and haptic feedback driver 50 may be selected from a variety of devices capable of providing feedback. The driver 50 is generally illustrated in FIG. 1 as a solenoid. As further illustrated in FIG. 1, the haptic feedback driver 50 includes an exemplary rigid attachment 52 which attaches the driver 50 to the base 12. As further illustrated in FIG. 1, a shaft 58 extends from the driver 50 to be coupled to or attached to an interface attachment 54 which is connected or coupled to the haptic interface 20. Of course, any known method of connecting the haptic feedback driver between the base 12 and haptic interface 20 such as to move the haptic interface 20 along an axis of motion relative to the base 12 may be used.

The haptic interface 20 may be formed in a variety of styles and configurations. The haptic interface 20 as illustrated in FIGS. 1 and 3 as a dual-style input surface having both a touch surface 60 and a mechanical interface 70.

Figure 2:
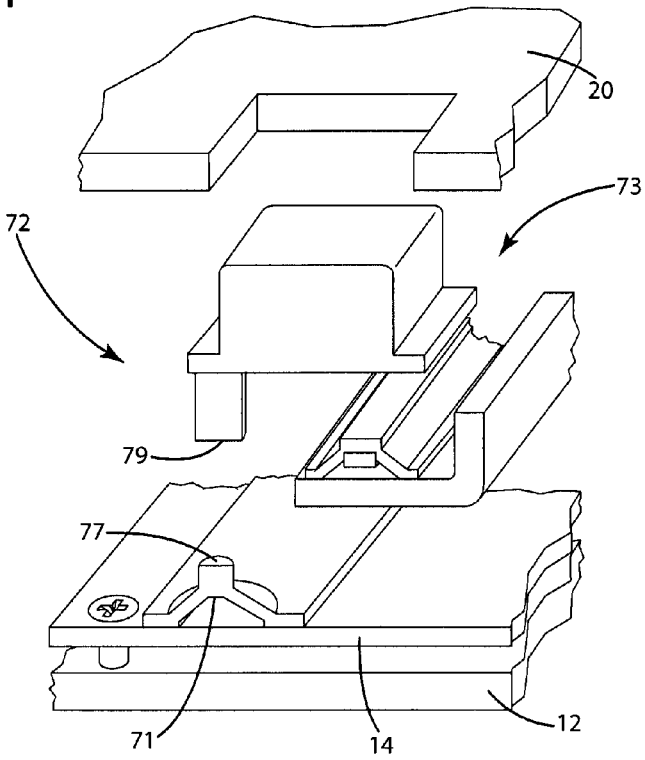
FIG. 2 is an enlarged perspective view of the mechanical button in FIG. 1.
Figure 3:
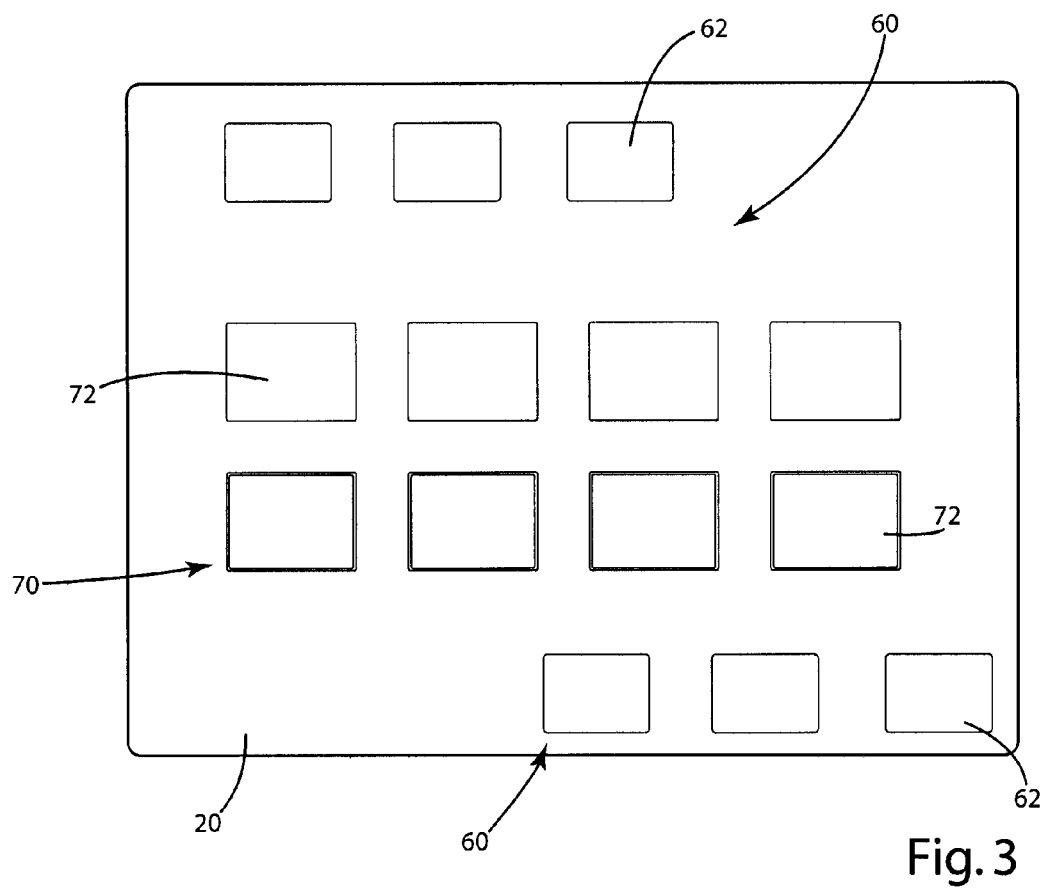
FIG. 3 is a front view exemplary haptic surface including mechanical buttons.
Figure 4:
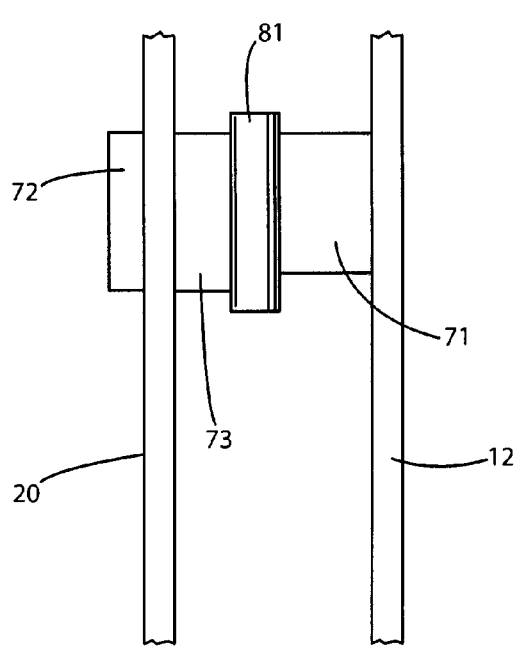
FIG. 4 is a schematic view of a mechanical button including a mechanical isolator.
Figure 5:
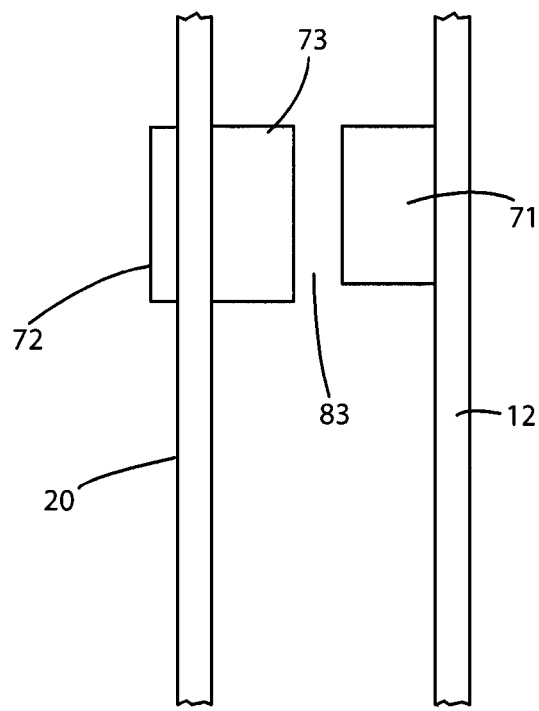
FIG. 5 is a schematic view of an air gap mechanical button.

As illustrated in FIGS. 1 and 3, the haptic interface 20 includes a mechanical interface 70. As generally referred to herein, the mechanical interface 70 is formed of mechanical or electronic buttons 72. More specifically, the mechanical buttons 72 are not digitally represented buttons, such as those typically represented by a touch surface interface that may be configured to take on different shapes, sizes and styles or are moveable about the touch screen interface 60. For example, while the mechanical buttons 72 may be programmed to perform different functions and select different input, the shape, style, size and location as well as the dimensional configuration of the mechanical buttons 72 are consistent and more specifically, physically consistent. Typically, the only styling change available is different intensities and styles or colors of illumination. The mechanical buttons 72 may be traditional mechanical buttons which may be depressed inward, as illustrated in FIGS. 1 and 2, or variations thereof as illustrated in FIGS. 4 and 5. The mechanical buttons 72 may also be configured to touch sensitive and in some embodiments will not move except with the haptic motion 22.

As illustrated in FIGS. 1 and 2, the button 72 may be configured as a two-part system. The specifics of the button retaining system and guidance system are omitted from the figures. Any number of guidance and retaining systems can be used. The first part 71 is attached to the base 12 and includes as much of the mass and controls as possible. The second part 73, which is configured to be as light as possible, is coupled to the haptic surface 20. A sliding interface 75 is located between the first and second parts 71 and 73. Of course, other interfaces that allow haptic motion between the base and the touch interface may be used. The sliding interface 75 allows the second part 73 to move relative to the first part 71 with as little friction as possible, yet translate the button motion 76 to an input from the second part 73 to the first part 71. The exemplary button 72 illustrated in FIGS. 1 and 2 includes a conical or domed portion 77 on one of the first and second portions 71 and 73 and a flat surface 79 on the other of the first and second parts 71 and 73. Of course, the interface 75 could be formed in a variety of other configurations that allow motion relative to another with minimal friction, while allowing input motion to the bottom 72 along arrow 76.

As illustrated in FIG. 4, instead of the sliding interface 75 illustrated in FIG. 2, an isolator (or sacrificial wear material) 81 is placed between the first and second parts 71 and 73. The isolator 81 allows movement of the first and second parts 71 and 73 relative to each other. The isolator 81 may be any material that does not inhibit haptic motion as shown by arrow 22 and has sufficient rigidity to ensure switch closure without causing inadvertent closure of the mechanical. An example of this would be high density polyethylene sheet with fixed degrees of freedom except in the direction of switch actuation and align with the conical or domed portion 77 to flat surface 79 on the other of the first and second parts 71 and 73.

As illustrated in FIG. 5, the mechanical buttons may be separated by an air gap 83 with the first part 71 reconnecting when the second part 73 approaches while being pressed. Of course, with this design, the haptic interface 20 may hold the button 72 and move it relative to the other components of the button 72 such that the flexible member does not need to be used and that the button works as the surface moves. This configuration minimizes friction, but requires tighter tolerance around the alignment of the first part 71 to the second part 73.

Figure 6:
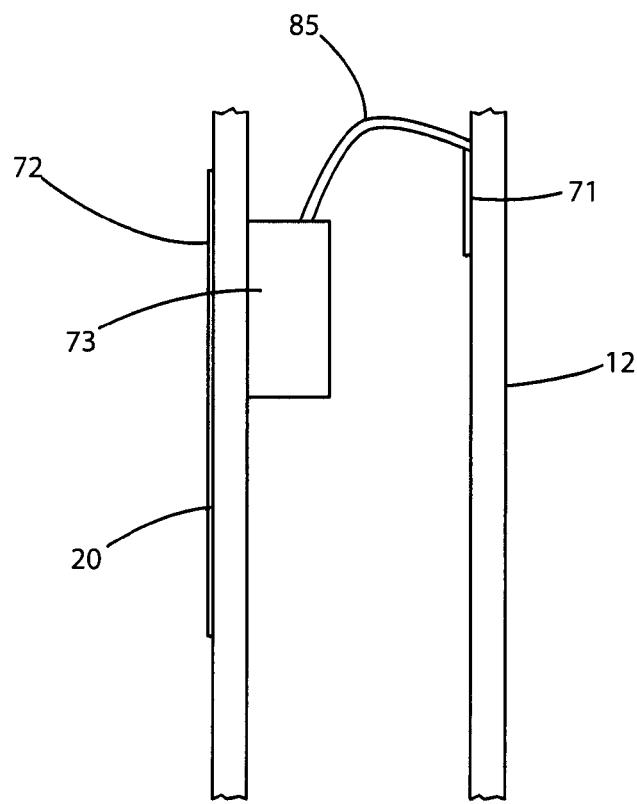
FIG. 6 is a schematic view of an electronically connected mechanical button.

As illustrated in FIG. 6, the traditional button that is fully integrated into the haptic surface 20. A slender wire or flex circuit 85 would connect the first and second parts 71 and 73. This configuration may be required for various reasons to integrate portions of traditional buttons into the haptic surface. The button may be flat with the surface or at any other angle to the surface as illustrated in FIG. 6.

As with all the illustrated examples and above discussed exemplary buttons, the haptic surface 20 remains free to move relative to the base 12 and the potential for friction is minimized. The buttons are also configured to minimize visible gaps in the haptic surface 20. Therefore, buttons that are not digitally created may be integrated into large haptic surfaces, such as touch screen displays.

The touch surface interface 60 may also be used as partially illustrated in FIGS. 1 and 3. The touch surface interface 60 may include a variety of configurations, displays, and configurable options as desired. Of course, the touch surface interface 60 may also include touch surface buttons 62 such as virtual buttons that are shown on the screen that when touched, haptic feedback movement of the interface surface 60 is provided. The touch surface interface 60 may also be connected with the circuit board 14 and various other controllers or processors 66 via the flex circuit 64 as illustrated in FIG. 2.

The haptic interface 20 is generally coupled to the base 12 in some moveable arrangement such as the illustrated guidance system 30. The guidance system 30 used may vary depending on the size and design requirements of the haptic interface 20. As illustrated in FIG. 1, the haptic interface 20 is shown being coupled to the rigid base 12 with two mechanisms 30 shown in this view. Actual number and design can vary depend on specific desired characteristics.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:
1. A haptic system comprising
   a haptic interface;
   a base coupled to said haptic interface;

a haptic driver coupled to each of said haptic interface and said base and wherein said haptic driver is configured to move said haptic interface relative to said base along said single axis of travel;

at least one mechanical button includes in said haptic interface, and configured to move with the haptic interface relative to said base; and wherein said button includes a first portion coupled to said base and a second portion coupled to said haptic interface.

2. The haptic system of claim 1 wherein said haptic driver includes a shaft aligned with an interface axis of travel.

3. The haptic system of claim 2 wherein said mechanical button is capable of moving relative to said haptic interface along a button axis of travel and wherein said button axis is approximately perpendicular to said haptic axis.

4. The haptic system of claim 2 wherein said second portion is capable of moving relative to said first portion along said interface axis.

5. The haptic system of claim 2 wherein said first portion and said second portion meet at a sliding interface.

6. The haptic system of claim 1 wherein said haptic service includes a touch screen interface.

7. The haptic system of claim 2 further including an isolator disposed between said first and second portions.

8. The haptic system of claim 2 wherein said first portion is separated from said second portion by an air gap.

9. The haptic system of claim 8 wherein said first portion is capable of receiving an input from said second portion without touching.

10. The haptic system of claim 8 wherein said first portion is electrically coupled to said second portion.

11. The haptic system of claim 1 wherein said button is fixed from movement relative to said haptic interface.

12. The haptic system of claim 1 wherein said button is engraved on the surface of haptic interface.

13. The haptic system of claim 1 wherein said haptic surface includes a touch screen interface and wherein said mechanical button is electronically decoupled from said touch screen interface.

14. The haptic system of claim 1 wherein at least three of said mechanical buttons on said interface surface are driven with a single haptic feedback driver.

15. The haptic system of claim 1 wherein said mechanical button is not directly connected to said haptic feedback driver.

16. The haptic system of claim 15 wherein said mechanical button receives haptic feedback from said haptic feedback driver through said haptic interface therebetween.

* * * * *